United States Patent [19]

Fisher

[11] Patent Number: 5,101,662
[45] Date of Patent: Apr. 7, 1992

[54] HARMONICALLY FILTERED SPEED SENSING SYSTEM

[75] Inventor: Joseph R. Fisher, Sudbury, Mass.

[73] Assignee: Pacer Systems Inc., Billerica, Mass.

[21] Appl. No.: 587,671

[22] Filed: Sep. 24, 1990

[51] Int. Cl.⁵ .............................................. G01C 21/10
[52] U.S. Cl. .................................... 73/182; 73/189
[58] Field of Search ............ 73/182, 189, 181, 861.42, 73/861.65, 178 R

[56] References Cited

U.S. PATENT DOCUMENTS

| | | | |
|---|---|---|---|
| 3,372,596 | 3/1968 | Keller | 73/861.42 |
| 3,382,715 | 5/1968 | Larkam et al. | 73/861.65 |
| 3,400,584 | 9/1968 | Beilman | 73/182 |
| 4,360,888 | 11/1982 | Onksen et al. | 73/182 |

Primary Examiner—Donald O. Woodiel
Attorney, Agent, or Firm—Iandiorio & Dingman

[57] ABSTRACT

An omnidirectional speed sensing system includes a rotatable member; a channel supported by the rotatable member and having an inlet and an outlet; a single pressure sensing port in the system disposed the channel between the inlet and the outlet for sensing the dynamic pressure of the fluid flow through the channel which pressure is a function of the rotational speed of the rotatable member and the velocity of the rotatable member through the fluid; transducer means responsive to the pressure at the sensing port for producing a pressure signal; means responsive to the pressure signal for extracting the first harmonic of the pressure signal; and means responsive to the magnitude and phase of the first harmonic of the pressure signal for indicating the velocity and direction of the sensed speed.

4 Claims, 2 Drawing Sheets

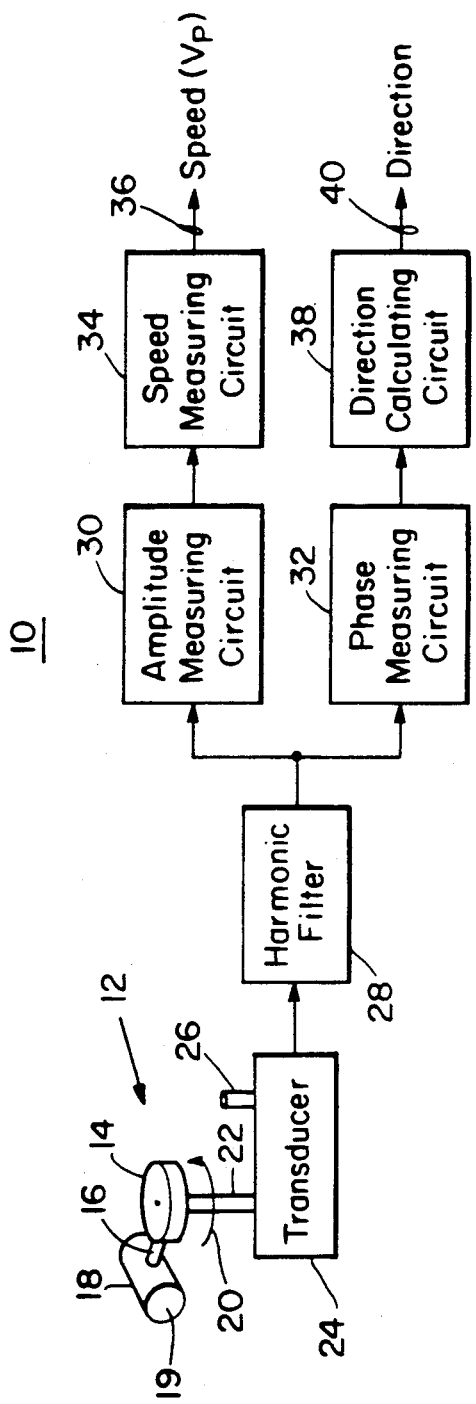
Fig. 1
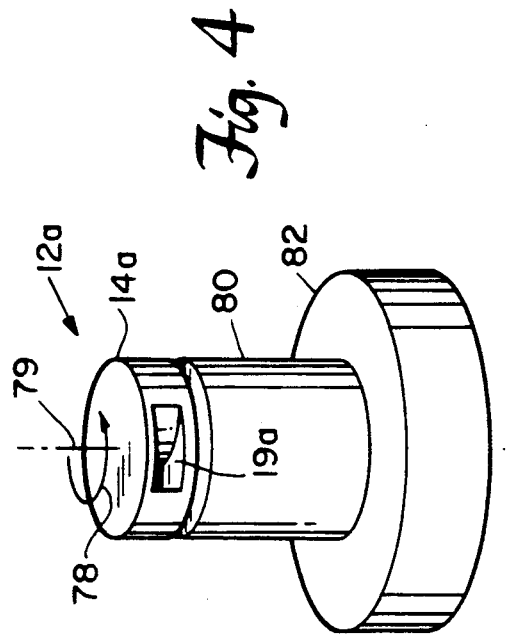
Fig. 4
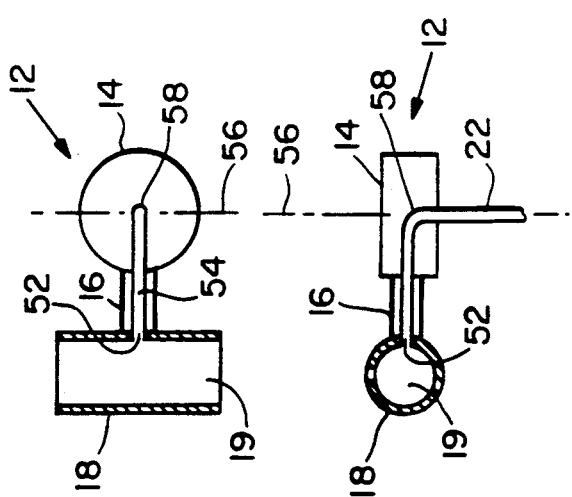
Fig. 2
Fig. 3

HARMONICALLY FILTERED SPEED SENSING SYSTEM

FIELD OF INVENTION

This invention relates to an omnidirectional speed sensing system, and more particularly to such a system which utilizes a harmonic filtering approach with a simpler, more compact rotating pressure sensor arrangement.

BACKGROUND OF INVENTION

One conventional omnidirectional air speed sensing system uses a pair of pressure sensing ports disposed within shrouds mounted on the distal ends of diametrically opposed arms rotatable about their central axis. A pressure transducer at the conjunction of the arms senses the differential pressure at the two pressure ports and converts that to an electrical signal which is transmitted along the rotating shaft through slip rings to the electronic circuits which determine the air speed from the differential pressure signal. By using two spaced pressure sensing ports, that system inherently pneumatically cancels signals such as the d.c. component, and second harmonic and higher harmonics which are not essential to determining air speed and leave a single, first harmonic, linear in nature, which represents by its amplitude, the air speed, and by its phase, the sense of direction of the aircraft. The elongate arms which support the pressure ports serve to increase the magnitude of the first harmonic and thus insure higher signal-to-noise ratios and more accurate speed readings.

The elongate rotatable arms tend to make the device large, cumbersome and delicate, as well as difficult to place on aircraft boats and other vehicles. Since the two pressure ports contribute to the cancellation of unwanted signal components, the arms, ports and shrouds must be carefully balanced and mirror each other to a high degree to ensure that the final signal output is clean and accurate. If the differential pressure transducer is in the rotating part then the electrical signal must be transmitted from the rotating to the non-rotating part using slip rings or the like, which add expense as well as maintenance and reliability problems. If the differential pressure transducer is in the non-rotating part then there are two pressures that have to be conducted from the rotating to the non-rotating part.

SUMMARY OF INVENTION

It is therefore an object of this invention to provide an improved omnidirectional speed sensing system.

It is a further object of this invention to provide such an improved omnidirectional speed sensing system which eliminates one of the pressure ports and arms while preserving accurate, reliable speed measurement.

It is a further object of this invention to provide such an improved omnidirectional speed sensing system which is smaller, more compact and rugged without sacrificing performance and accuracy.

It is a further object of this invention to provide such an improved omnidirectional speed sensing system which uses one and only one pressure port to obtain air speed and direction information.

It is a further object of this invention to provide such an improved omnidirectional speed sensing system which requires no elongate arm for spacing the pressure port.

It is a further object of this invention to provide such an improved omnidirectional speed sensing system which requires no slip rings.

It is a further object of this invention to provide such an improved omnidirectional speed sensing system which need transmit only one parameter, be it pressure or an electrical signal from the rotating to non-rotating part of the system.

It is a further object of this invention to provide such an improved speed sensing system useable in air, water or other fluids for sensing speed of aircraft, boats and the like.

The invention results from the realization that a smaller, more compact, more rugged and reliable omnidirectional speed sensing system can be achieved by eliminating one of the two sensing arms of a conventional omnidirectional speed sensing system and in conjunction with the single remaining pressure port substituting a process of harmonic filtering to extract the fundamental or first harmonic component of the sensed pressure wave, in place of the two-arm pneumatic cancellation technique of the conventional systems, from which first harmonic the speed and direction can be determined.

This invention features an omnidirectional speed sensing system including a rotatable member and a channel supported by the rotatable member and having an inlet and an outlet; a single pressure sensing port in the system disposed in the channel between the inlet and the outlet senses the dynamic pressure of the fluid flow through the channel, which is a function of the rotational speed of the rotatable member and the velocity of the rotatable member through the fluid. Transducer means responsive to the pressure at the sensing port produce a pressure signal, and means responsive to the pressure signal extract the first harmonic of the pressure signal. Means responsive to the magnitude and phase of the pressure signal indicate the velocity and the direction, respectively, of the sensed signal.

In a preferred embodiment the rotatable member includes an arm, a shroud at the distal end of the arm, and the shroud includes the channel.

Alternatively, the rotating member may include a hub and a channel through the hub. The system may also include a source of ambient pressure, and the transducer may include a differential pressure transducer responsive to the dynamic and the ambient pressure to produce the pressure signal.

DISCLOSURE OF PREFERRED EMBODIMENT

Other objects, features and advantages will occur to those skilled in the art from the following description of a preferred embodiment and the accompanying drawings, in which:

FIG. 1 is a schematic block diagram of an omnidirectional sensing system according to this invention;

FIG. 2 is a schematic top plan view of the rotatable pressure sensing head of FIG. 1;

FIG. 3 is a schematic side elevational sectional view of a portion of the rotatable pressure sensing head of FIGS. 1 and 2;

FIG. 4 is a three-dimensional view of an omnidirectional speed sensing system according to this invention similar to that shown in FIGS. 1-3 employing an alternative rotatable pressure sensing head;

Figure 5:
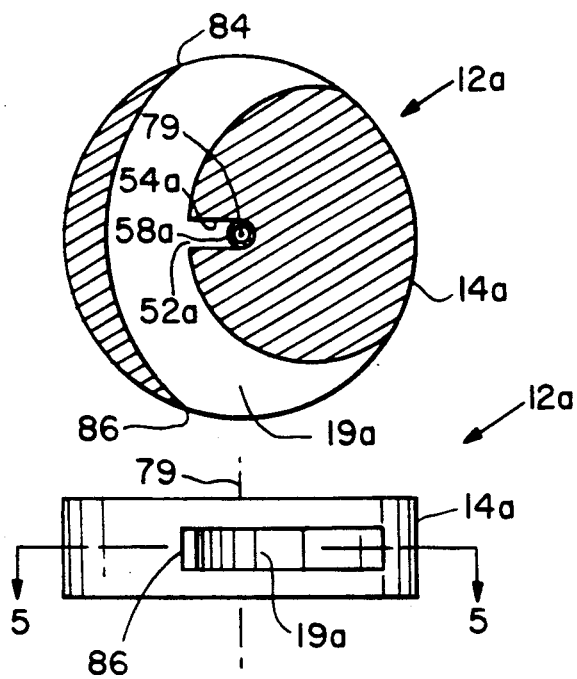
FIG. 5 is an enlarged schematic sectional top plan view of the rotatable pressure sensing head of FIG. 4 taken along line 5—5 of FIG. 6.

This invention is an improvement over the conventional systems known as LORAS and OADS, U.S. Pat. Nos. 3,373,605; 3,400,584; and 4,360,888, which are incorporated here by reference in their entirety. In those conventional systems, the velocity of fluid flow is measured by sensing the differential pressure between two pressure sensing ports enclosed within shrouds at the ends of elongated rotating arms. The pressure ports sense the effects of fluid flow through the shrouds and past the pressure sensing ports. The pressure at the two pressure sensing ports is conducted to a differential pressure transducer which rotates with the arms. In such systems, the pressure in one arm is:

$$P_1 = P_0 - P_V \tag{1}$$

where $P_0$ is the ambient or static pressure and $-P_V$ represents the decrease in pressure caused by the flow of fluid, be it gas or liquid, past the pressure sensing port within the shroud at the end of the arm. According to Bernoulli's Principle, $$P_V = \tfrac{1}{2} \rho V^2_{net} \tag{2}$$

where $\rho$ is the density of the fluid and $V_{net}$ results from the combined effects of the tangential speed of rotation $V_R$ of the shroud and the speed $V_F$ of the flow of the surrounding fluid past the entire apparatus, which is assumed to be uniform either unchanging in time or changing slowly compared to the period of rotation of the shroud. The exact relationship among $V_R$, $V_F$ and $V_{net}$ depends upon various geometric and fluid dynamic effects, but is reasonably approximated by $$V_{net} = V_R + V_F \cos \phi \cos \theta \tag{3}$$

where $\theta$ is the angle between the direction of the fluid flow and the plane of rotation of the arms and shrouds and where $\phi$ is the angle measured in the plane of rotation between the projection of the fluid flow velocity vector onto the plane and the instantaneous direction of motion of the shroud. The angle $\phi$ increases at a constant rate with time as a result of the constant rotation rate of the arms and shrouds. If $V_P$ is equal to $V_F \cos \theta$ (the projected component of fluid flow) then $$P_1 = P_0 - \tfrac{1}{2} \rho (V_R + V_P \cos \phi)^2 \tag{4}$$

The instantaneous motion of the second shroud is directly opposite to that of the first shroud since it is mounted diametrically opposed from it. Thus the component of the surrounding fluid flow through the second shroud is the negative of that for the first shroud. Therefore the pressure $P_2$ in the second arm is $$P_2 = P_0 - \tfrac{1}{2} \rho (V_R - V_P \cos \phi)^2. \tag{5}$$

The differential pressure sensed in these systems is then expressed as $$P_1 - P_2 = -\tfrac{1}{2} \rho [(V_R + V_P \cos \phi)^2 - (V_R - V_P \cos \phi)^2]. \tag{6}$$

This can be simplified to $$P_1 - P_2 = -\tfrac{1}{2} \rho [4 V_R V_P \cos \phi] \tag{7}$$

and once again reduced to simply $$P_1 - P_2 = -2 \rho V_R V_P \cos \phi \tag{8}$$

where $-2\rho V_R$ becomes a constant multiplier of the velocity $V_P$ and the phase $\phi$ represents the direction of the velocity. Thus as the arms of the LORAS or OADS sensor rotate, the output signal voltage from the differential pressure transducer is a cosine wave at a frequency equal to the rotational rate, with the amplitude proportional to the magnitude of the in-plane component of the fluid flow velocity and to the rotational speed of the shrouds, and with phase such that the extremes of voltage occur when the shrouds are moving instantaneously directly into and away from the projected component of fluid flow. Thus, through the use of two equal and opposite sensing devices on diametrically opposed elongate arms, the LORAS or OADS system is able to acquire a fairly strong signal in which all the other terms cancel, leaving a simple expression for the velocity and direction of the speed. This is not the case when one of those sensing arms is eliminated. Rather, the signal emanating from a single sensing arm or port is not the beneficiary of any cancelling effect which would simplify the obtaining of the essential information.

In accordance with this invention, the fluid flow path formed by a single rotating pressure sensing port obeys the same principle as in a single shroud of the LORAS or OADS systems and the pressure at the port is given approximately by $$P_N = P_0 - \tfrac{1}{2} [V_0 + V_1(\phi)]^2 \tag{9}$$

where $V_0$ is the flow past the pressure port induced by rotation alone and $V_1(\phi)$ represents the additional flow past the pressure port resulting from the flow of the fluid surrounding the device, that is, the movement of the sensor through the fluid medium. The difference in pressure present at the dynamic and static inlets of the pressure transducer is thus represented as $$\Delta P = P_N - P_0 \tag{10}$$

$$\Delta P = -\tfrac{1}{2} \rho [V_0 + V_1(\phi)]^2 \tag{11}$$

The terms $V_0$ and $V_1(\phi)$ are analogous to, and in some configurations of this invention may have exactly the same mathematical form as the terms $V_R$ and $V_P \cos \phi$ in the conventional LORAS or OADS system.

In the particular case of the configuration shown in FIG. 2 which is essentially a modification of LORAS in which one arm has been removed and the remaining arm shortened but in which the shroud is essentially unchanged, the speed $V_1(\phi)$ would be equal to $V_P \cos \phi$ and the speed $V_0$ would be equal to $V_R$, the tangential speed of the shroud. Note, however, that shortening the arm reduces this tangential speed for a fixed rotation rate.

In this special case $$\Delta P = -1/2 \rho [V_R + V_F \cos\phi]^2 \tag{12}$$

$$= -1/2 \rho [V_R^2 + 2 V_R V_F \cos\phi + V_F^2 \cos^2\phi] \tag{13}$$

$$= -1/2 \rho [V_R^2 + V_F^2(1 + \cos 2\phi)/2 + 2 V_R V_F \cos\phi] \tag{14}$$

Where the latter result makes use of the trigonometric identity $$\cos^2 \phi = \tfrac{1}{2}[1+\cos 2\phi] \quad (15)$$

Of the three terms which add to form $\Delta P$ in equation (14) only the third term $\tfrac{1}{2}\rho[2V_R V_P \cos \phi]$ varies sinusoidally at the rotation rate of the arm. Of the other two terms, the first, $\tfrac{1}{2}\rho[V_R{}^2]$, does not change with $\phi$ as the arm rotates and hence can be blocked by a band pass filter which is tuned to transmit the first harmonic or fundamental $\cos \phi$. The second term, $\tfrac{1}{2}\rho[V_P{}^2(1+\cos 2\phi)/2]$, comprises the sum of another unchanging value $\tfrac{1}{2}\rho[V^2\rho/2]$, which is likewise blocked and $\tfrac{1}{2}\rho[V^2\rho(\cos 2\phi)/2]$ which is proportional to the second harmonic of $\cos \phi$ and can also be blocked by the same band pass filter because it is higher in frequency than the fundamental which the filter is designed to transmit.

The output of this harmonic selective filter then consists only of the single term $$-\rho V_R V_P \cos \phi \quad (16)$$

which is exactly one half of the corresponding expression derived for the LORAS sensor. Thus the above described harmonic filter blocks the terms in the output of this invention which in a LORAS sensor are cancelled by subtraction of anti-symmetric contributions from the two arms of the LORAS sensor.

An omnidirectional speed sensing system 10, FIG. 1, according to this invention in one embodiment includes a pressure sensing head 12 including a rotatable member 14, a single foreshortened arm 16, and a shroud 18 supported at the distal end of arm 16. The pressure sensing port is inside shroud 18 containing channel 19, which is rotated with rotatable member 14 in the direction of arrow 20. The pressure sensed at that port is directed through arm 16 in rotatable member 14, then through rotatable shaft 22 to transducer 24. Here it is typically compared with the ambient or static pressure available at input 26, and the signal representative of the differential pressure is delivered to harmonic filter 28. The connection between the rotatable shaft 22 and the transducer 24, which does not rotate, requires a pressure-tight rotatable coupling. Although transducer 24 is indicated as a differential pressure transducer with ambient pressure inlet 26, this is not a necessary limitation of the invention as a single pressure sensing transducer could be used. The sensing of the ambient pressure, however, assists in eliminating DC components and the like.

Harmonic filter 28 blocks any zero harmonic or DC levels as well as higher harmonics, and typically passes only the fundamental or first harmonic. This first harmonic sinusoidal waveform is submitted to the amplitude measuring circuit 30 and to the phase measuring circuit 32. These circuits may be simply a peak detector and a timer and zero-crossing detector, respectively. The amplitude is then delivered to speed calculating circuit 34, which may be a scaling of measured amplitude to speed units, which directly delivers the speed $V_P$ on line 36. The phase measuring circuit 32 provides its output to direction calculating circuit 38, which may be a scaling of the measured time at the zero crossing to obtain the angle, which directly indicates on line 40 the direction of motion of the apparatus with respect to the surrounding fluid.

Pressure port 52, FIG. 2, may be simply a hole in the wall of shroud 18, which communicates with a passage 54 through arm 16 and communicates at the central axis 56 with a bore 58, FIG. 3, that passes through drive shaft 22 to communicate with transducer 24. Although a short arm is used in FIGS. 1-3 to support shroud 18 and to locate pressure port 52 remotely from rotatable member 14, this is not a necessary limitation of the invention. The arm may be shortened even further than shown in FIGS. 1-3 or totally eliminated. In fact, in one embodiment there is no arm and no shroud used; the rotatable member or hub 14a, FIG. 4, contains the channel 19a.

Figure 6:
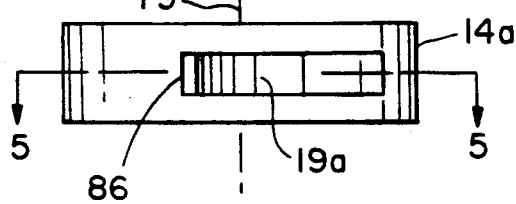
FIG. 6 is a side schematic sectional elevational view of the rotatable pressure sensing head of FIGS. 4 and 5.

Rotatable member or hub 14a is mounted on column 80 on base 82 for rotation in the direction of arrow 78 about axis 79. Rotatable member or hub 14a includes a channel 19a having an inlet 86, FIGS. 5 and 6, and an outlet 84. Pressure sensing port 52a communicates via passage 54a with bore 58a centered on axis 79.

Figure 7:
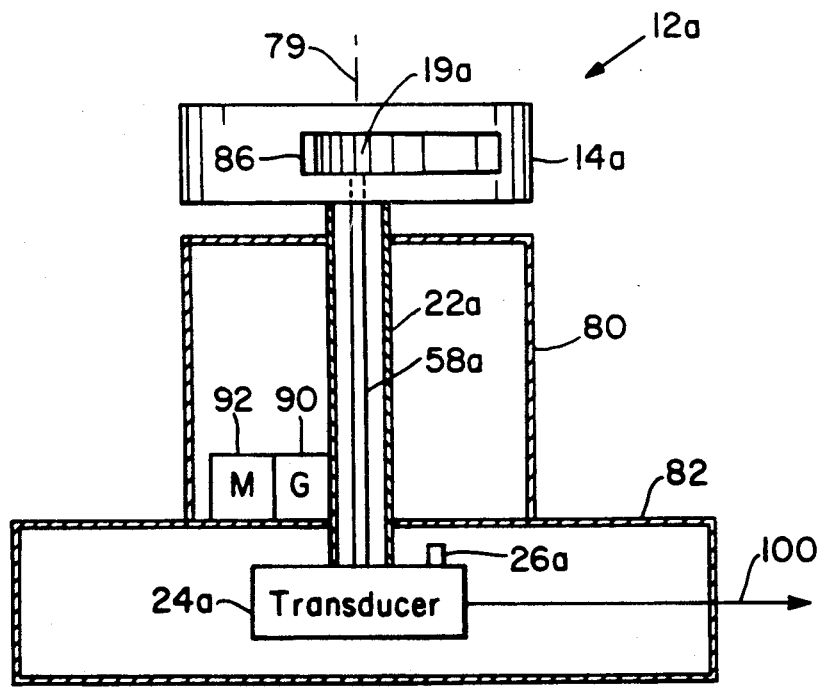
FIG. 7 is a schematic side elevational sectional view of the pressure sensing head and system of FIG. 4.

Hub 14a is fixed to rotate with shaft 22a, FIG. 7, which is driven through gears 90 by motor 92. Shaft 22a is hollow, as indicated previously, to contain bore 58a, which communicates the pressure from port 52a through passage 54a to transducer 24a. Transducer 24a provides a signal indicative of that pressure and, if provided with an ambient pressure sensing input 26a, provides a signal indicating the difference between the two pressures on line 100. The output on line 100 is fed directly to harmonic filter 28, and the subsequent circuitry is shown in FIG. 1.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An omnidirectional speed sensing system for determining the relative speed and direction of a fluid, comprising:
   a rotatable member;
   a channel supported by said rotatable member and having an inlet and an outlet communicating with the fluid;
   a pressure sensing port in the system disposed in said channel between said inlet and outlet for sensing the dynamic pressure of the fluid flow through the channel, the pressure being a function of the rotational speeds of said inlet and outlet and the relative speed of the rotatable member through the fluid;
   transducer means, responsive to said pressure at said sensing port, for producing a pressure signal;
   means, responsive to said pressure signal, for extracting the first harmonic of said pressure signal; and
   means, responsive to the magnitude and phase of said first harmonic of said pressure signal, for indicating the relative speed and direction of the fluid.

2. The omnidirectional speed sensing system of claim 1 in which said rotatable member includes an arm, a shroud at the distal end of said arm, and said shroud includes said channel.

3. The omnidirectional speed sensing system of claim 1 in which said rotatable member includes a hub, and said hub includes said channel.

4. The omnidirectional speed sensing system of claim 1 further including a source of ambient pressure and said transducer means includes a differential pressure transducer, responsive to said dynamic pressure and said ambient pressure to produce said pressure signal.

* * * * *